United States Patent
Botea et al.

(10) Patent No.: US 9,541,412 B1
(45) Date of Patent: Jan. 10, 2017

(54) METHOD, COMPUTER READABLE STORAGE MEDIUM AND SYSTEM FOR PROVIDING A SAFE MOBILITY AREA

(71) Applicant: International Business Machines Corporation, Armonk, NY (US)

(72) Inventors: Adi Botea, Dublin (IE); Radu Marinescu, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/945,984

(22) Filed: Nov. 19, 2015

(51) Int. Cl.
*G01C 21/34* (2006.01)
*G01C 21/36* (2006.01)

(52) U.S. Cl.
CPC ......... *G01C 21/343* (2013.01); *G01C 21/3476* (2013.01); *G01C 21/367* (2013.01); *G01C 21/3682* (2013.01)

(58) Field of Classification Search
CPC ............ G08G 1/0967; G08G 1/096816; G08G 1/096866; G08G 1/096888; G08G 1/0133; G08G 1/04
USPC ..... 701/118, 26, 465, 516, 533; 340/539.13, 340/909, 990
See application file for complete search history.

(56) References Cited

U.S. PATENT DOCUMENTS

| | | | |
|---|---|---|---|
| 6,480,783 B1* | 11/2002 | Myr | G01C 21/3492 340/990 |
| 7,321,826 B2 | 1/2008 | Sheha et al. | |
| 8,249,548 B2 | 8/2012 | Yang et al. | |
| 8,583,365 B2 | 11/2013 | Jang et al. | |
| 2006/0158330 A1* | 7/2006 | Gueziec | G01C 21/3492 340/539.13 |
| 2008/0094250 A1* | 4/2008 | Myr | G08G 1/04 340/909 |
| 2009/0319172 A1* | 12/2009 | Almeida | G01C 21/20 701/533 |
| 2010/0120422 A1 | 5/2010 | Cheung et al. | |
| 2011/0301841 A1* | 12/2011 | Schuurbiers | G01C 21/3492 701/465 |
| 2011/0313654 A1* | 12/2011 | Olson | G01C 21/3415 701/516 |
| 2015/0051823 A1* | 2/2015 | Joglekar | G08G 1/0145 701/118 |

FOREIGN PATENT DOCUMENTS

WO    WO 98/37722 A1    8/1998
WO    WO 2014005979 A1    1/2014

OTHER PUBLICATIONS

"Systems and Methods for a Smarter Metropolitan Transit Bus Recommender System", IP.com, 000225758, (Mar. 4, 2013), 8 pages.

"System and Method for Group Optimal Common Meeting Place Recommender using Individualized Spatio-Temporal Presence Information", IP.com, 000220496, (Aug. 2, 2012), 5 pages.

(Continued)

*Primary Examiner* — McDieunel Marc
(74) *Attorney, Agent, or Firm* — Scully, Scott, Murphy & Presser P.C.; Mercedes Hobson, Esq.

(57) ABSTRACT

Various embodiments relate to computing and displaying a safe mobility area for a user that allows the user to arrive at a final destination by a certain time after visiting one or more points of interest that are within the safe mobility area.

20 Claims, 7 Drawing Sheets

(56) References Cited

OTHER PUBLICATIONS

Solon, O., "TimeMaps generates isochronic maps from travel times", http://www.wired.co.uk/news/archive/2011-11/15/timemaps, (Accessed on Sep. 9, 2015), 2 pages.
"Isochronic Singapore: A Dynamic City Transportation Map", http://xiaoji-chen.com/blog/2011/isochronic-singapore/, (Accessed on Sep. 9, 2015) 6 pages.
"Travel Time Tube Map" http://www.tom-carden.co.uk/p5/tube_map_travel_Times/applet/, (Accessed on Sep. 9, 2015), 1 page.

\* cited by examiner

150

Current Time- 1:00pm

Final Destination Arrival Time - 5:00pm

POI 1 - Unavailable

POI 2 - Unavailable

POI 3 - Unavailable

POI 4 - 2 hours

POI 5 - 3 hours

POI 6 - 2.5 hours

POI 7 - 2.3 hours

FIG. 1B

METHOD, COMPUTER READABLE STORAGE MEDIUM AND SYSTEM FOR PROVIDING A SAFE MOBILITY AREA

BACKGROUND

Various embodiments relate to computing and displaying a safe mobility area for a user that allows the user to achieve a goal (subject to user preferences and constraints). In one example, the goal is to arrive at a final destination by a certain time.

SUMMARY

In one example, computing and displaying a safe mobility area for a user (in terms of time) may be carried out via a computer-implemented method. In another example, computing and displaying a safe mobility area for a user (in terms of time) may be carried out via a computer readable storage medium. In another example, computing and displaying a safe mobility area for a user (in terms of time) may be carried out via a computer-implemented system.

In one embodiment, a computer-implemented method for presenting to a user a safe mobility area is provided, the method comprising: obtaining, by a processor: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; determining by the processor the safe mobility area, the determined safe mobility area being an area on the map that the user should not leave in order to permit the user to reach the final destination by the acceptable arrival time; determining by the processor which of the plurality of points of interest on the map can be visited by the user, and for how long, in order to permit the user to reach the final destination by the acceptable arrival time; providing by the processor, on a display, the determined safe mobility area; and providing by the processor, on the display, which of the plurality of points of interest on the map can be visited by the user, and for how long.

In another embodiment, a computer readable storage medium, tangibly embodying a program of instructions executable by the computer for presenting to a user a safe mobility area is provided, the program of instructions, when executing, performing the following steps: obtaining: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; determining the safe mobility area, the determined safe mobility area being an area on the map that the user should not leave in order to permit the user to reach the final destination by the acceptable arrival time; determining which of the plurality of points of interest on the map can be visited by the user, and for how long, in order to permit the user to reach the final destination by the acceptable arrival time; providing, on a display, the determined safe mobility area; and providing, on the display, which of the plurality of points of interest on the map can be visited by the user, and for how long.

In another embodiment, a computer-implemented system for presenting to a user a safe mobility area is provided, the system including a display, the system comprising: a processor; and a memory storing computer readable instructions that, when executed by the processor, implement: an obtaining element configured to obtain: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; a first determining element configured to determine the safe mobility area, the determined safe mobility area being an area on the map that the user should not leave in order to permit the user to reach the final destination by the acceptable arrival time; a second determining element configured to determine which of the plurality of points of interest on the map can be visited by the user, and for how long, in order to permit the user to reach the final destination by the acceptable arrival time; a first providing element configured to provide, on the display, the determined safe mobility area; and a second providing element configured to provide, on the display, which of the plurality of points of interest on the map can be visited by the user, and for how long.

BRIEF DESCRIPTION OF THE DRAWINGS

Various objects, features and advantages of the present invention will become apparent to one skilled in the art, in view of the following detailed description taken in combination with the attached drawings, in which:

FIG. 1B depicts a diagram showing an example of a point of interest list according to an embodiment.

DETAILED DESCRIPTION

Figure 1A:
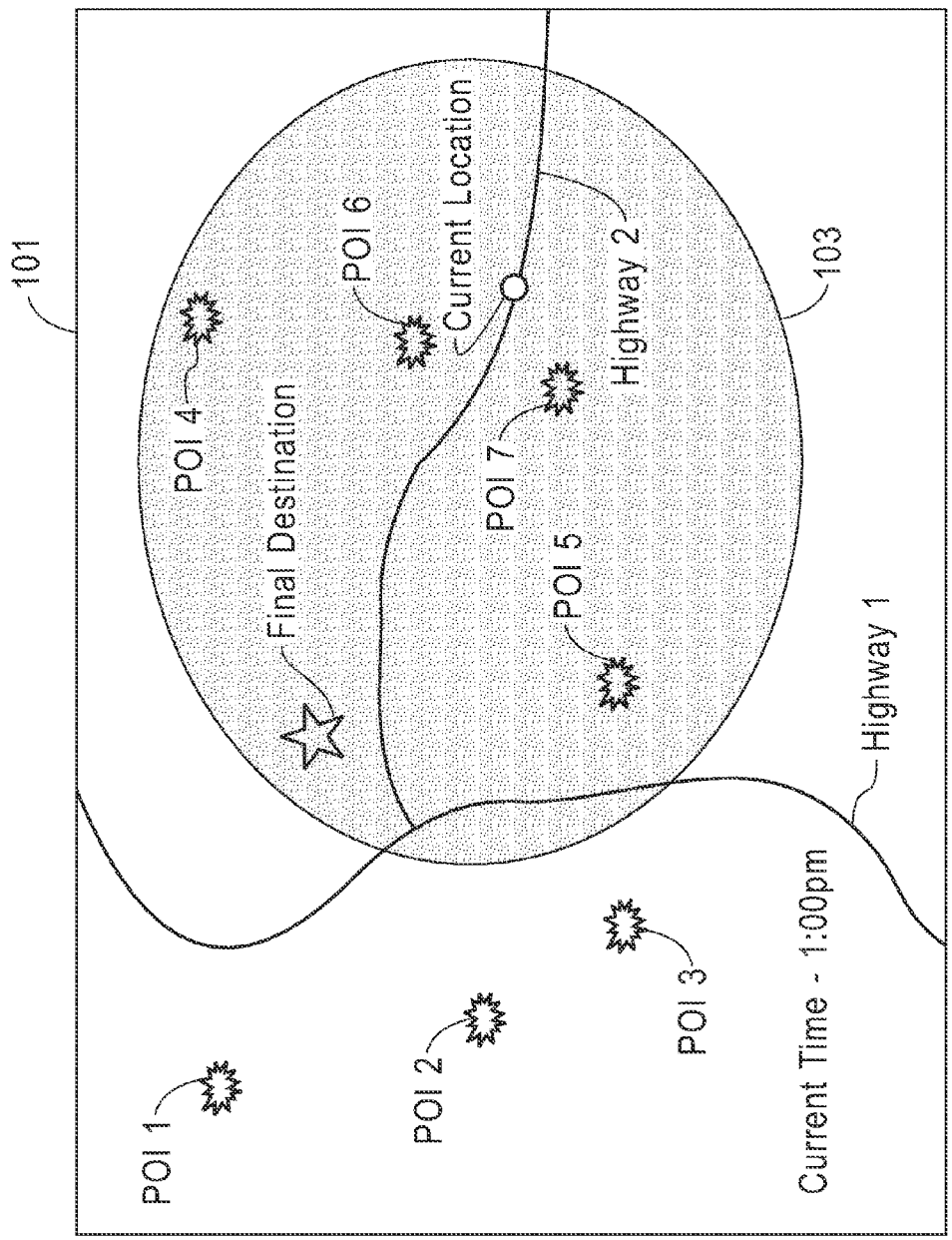
FIG. 1A depicts a diagram showing an example of a map display according to an embodiment.

Referring now to FIG. 1A, shown is an example of a map display according to an embodiment. As seen in this FIG. 1A, map display 101 includes, in this example, seven points of interest ("POI"), labeled here as POI 1-POI 7. Map display 101 also includes, in this example, "Highway 1", "Highway 2", an indicia of a "Final Destination" and an indicia of a user's "Current Location" (the current location may be determined, for example, via a GPS signal and/or via any other appropriate mechanism (e.g., cellular telephone cell site triangulation)). In addition, map display 101 shows the current time (here 1:00 pm) as well as a visual indication of a safe mobility area 103 (see the shaded area of map display 101). As seen, in this example, from the user's current location (at the current time), the safe mobility area 103 includes the "Final Destination" as well as POI 4-POI 7 (but not POI 1-POI 3).

Referring now to FIG. 1B, shown is an example of a point of interest list 150 according to an embodiment. This point of interest list 150 of FIG. 1B corresponds to the map display 101 of FIG. 1A. As seen, at the current time of 1:00 pm (and under the condition of a final destination arrival time of no later than 5:00 pm) each of POI 1-POI 3 is indicated as "Unavailable". Further, each of POI 4-POI 7 (which are in the safe mobility area 103 of FIG. 1A) has indicated therewith a respective length of time. Each of these lengths of time refers to how long a user may visit a given point of interest and still arrive at the final destination by the designated arrival time (each of the lengths of time may take into account, for example, distance as well as a current state of traffic congestion and/or weather effects).

Figure 2A:
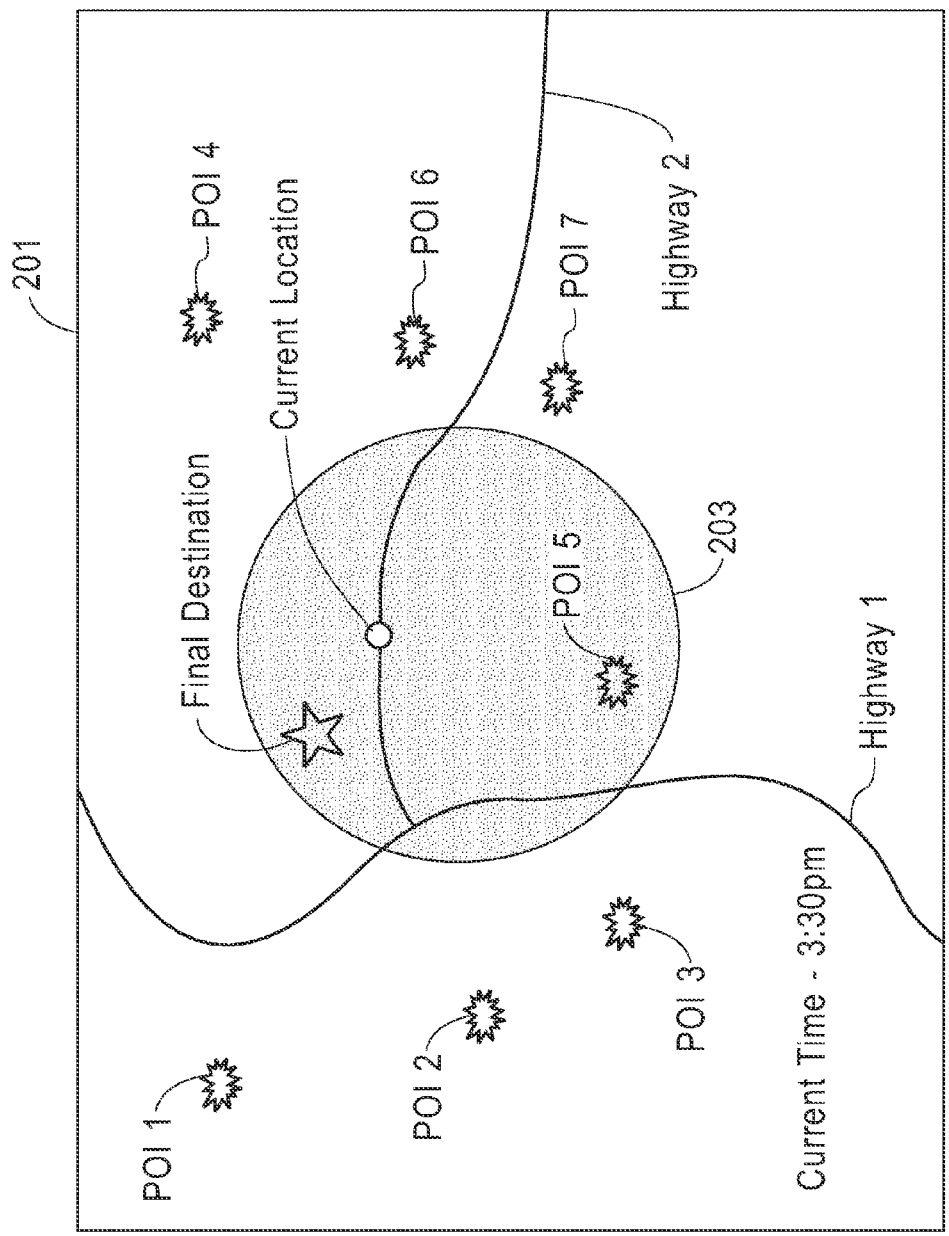
FIG. 2A depicts a diagram showing an example of a map display according to an embodiment.

Referring now to FIG. 2A, shown is another example of a map display according to an embodiment. As seen in this FIG. 2A, map display 201 (which is similar to map display 101) again includes, in this example, seven points of interest, labeled here as POI 1-POI 7. Map display 201 also again includes, in this example, "Highway 1", "Highway 2", an indicia of a "Final Destination" and an indicia of a user's "Current Location" (the current location may be determined, for example, via a GPS signal and/or via any other appropriate mechanism (e.g., cellular telephone cell site triangulation)). In addition, map display 101 shows the current time (here 3:30 pm) as well as a visual indication of a safe mobility area 203 (see the shaded area of map display 201). As seen, in this example, from the user's current location (at the current time), the safe mobility area 203 includes the "Final destination" as well as POI 5 (but not POI 1-POI 4 or POI6-POI 7). Of note, the safe mobility area 203 is smaller than the safe mobility area 103 because the arrival time has stayed the same but the current time has become later.

Figure 2B:
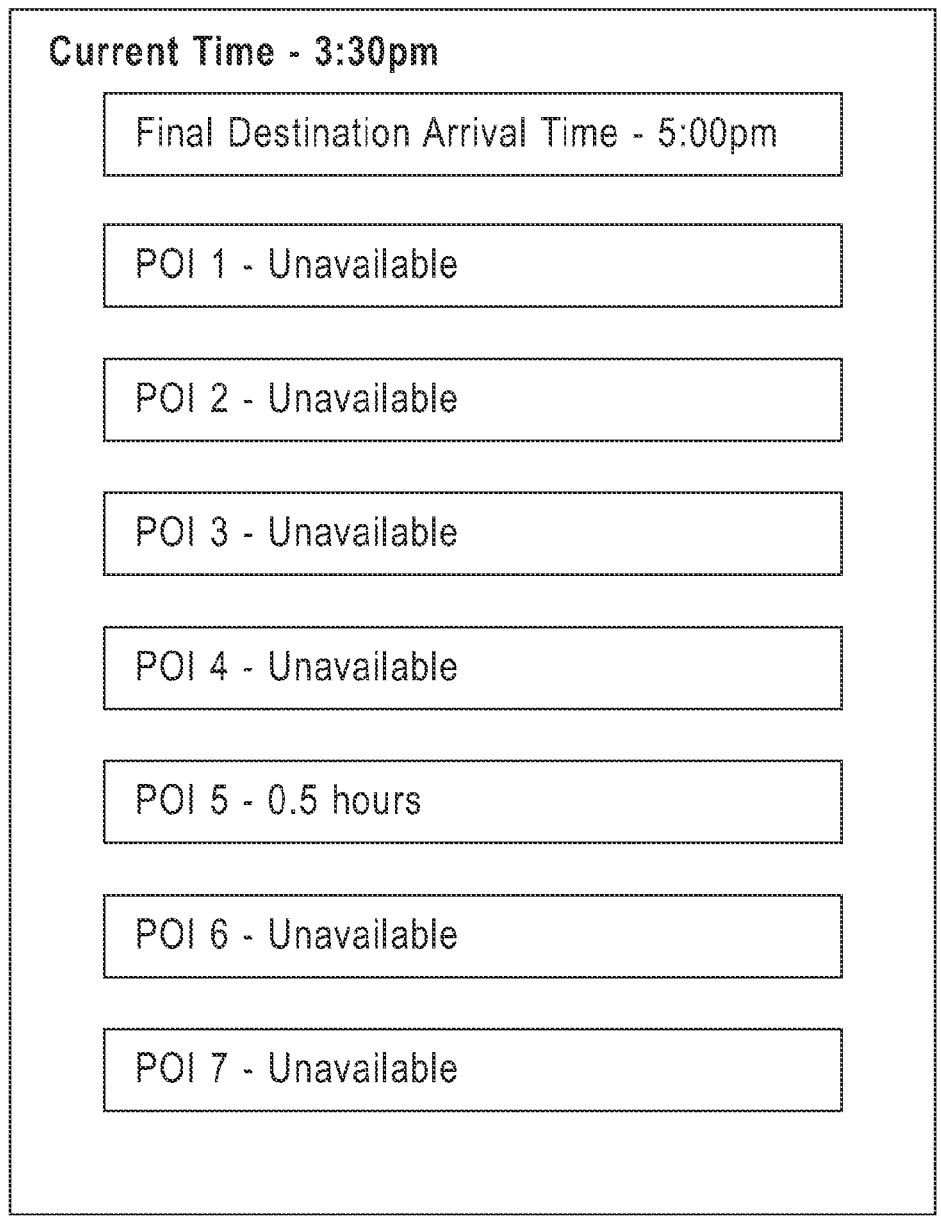
FIG. 2B depicts a diagram showing an example of a point of interest list according to an embodiment.

Referring now to FIG. 1B, shown is another example of a point of interest list 250 according to an embodiment. This point of interest list 250 of FIG. 2B corresponds to the map display 201 of FIG. 2A. As seen, at the current time of 3:30 pm (and under the condition of a final destination arrival time of no later than 5:00 pm) each of POI 1-POI 4 and POI 6-POI 7 is indicated as "Unavailable". Further, POI 5 (which is in the safe mobility area 203 of FIG. 2A) has indicated therewith a length of time. This length of time refers to how long a user may visit POI 5 and still arrive at the final destination by the designated arrival time (again, the length of time may take into account, for example, distance as well as a current state of traffic congestion and/or weather effects).

Reference will now be made to an example process of computing a safe mobility area. In this example, an iterative process is carried out. More particularly, the process iterates through all locations on the map, starting from the user's current location "S0" at iteration 0. The process grows the area around S0 with each iteration. At each iteration, the process decides whether a location S belongs to the safe mobility area. This decision may be carried out as follows: Compute the travel time from S0 to S and the travel time from S to D (where D is the final destination). If the arrival time at D is still before the arrival deadline, S belongs to the safe mobility area. In computing travel times, the process may include only those modes available (e.g., walking, car, bus, ferry, trains) that are set as acceptable by the user.

Still referring to the above-mentioned example process of computing a safe mobility area, the process may further display, for each point of interest (e.g., attraction) on the map, a maximum visitation time interval when the point of interest can be visited such that the arrival at the final destination is not jeopardized. For each point of interest, the lower threshold for the maximum visitation time interval may be equal to the current time plus the time to travel from the current position to that point of interest. Further, for each point of interest, the upper threshold for the maximum visitation time interval may be equal to the arrival time at the final destination minus the travel time from that point of interest to the final destination.

To give a specific concrete example regarding the computation of the maximum visitation time interval, if the current time is 10:00 am, if it would take 45 minutes to travel from the current location to a first point of interest, if it would take 1 hour to travel from the current location to a second point of interest, if it would take 2 hours to travel from the first point of interest to the final destination, if it would take 30 minutes to travel from the second point of interest to the final destination, and if the arrival time at the final destination were 6:00 pm then the lower threshold for the first point of interest would be 10:45 am and the upper threshold for the first point of interest would be 4:00 pm (resulting in a maximum visitation time interval for the first point of interest of 5 hours and 15 minutes). On the other hand, the lower threshold for the second point of interest would be 11:00 am and the upper threshold for the second point of interest would be 5:30 pm (resulting in a maximum visitation time interval for the second point of interest of 6 hours and 30 minutes).

Of course, as the current time and/or the current location changes, the safe mobility area changes. Similarly, as the current time and/or the current location changes, the maximum visitation time interval for each point of interest changes (for example, spending some time at one point of interest will reduce the available time at the other point(s) of interest).

Figure 3:
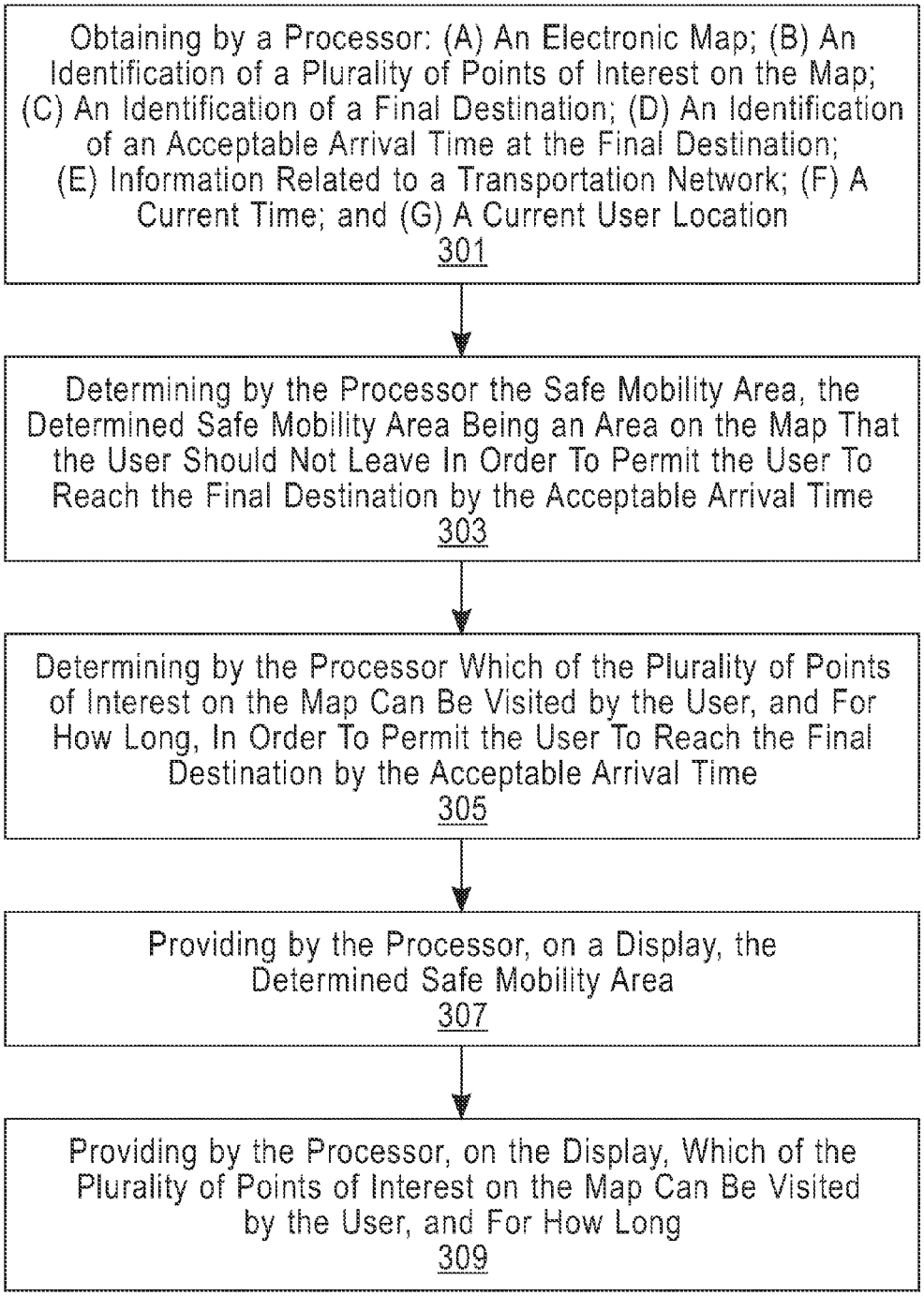
FIG. 3 depicts a flowchart of a method according to an embodiment.

Referring now to FIG. 3, a method for presenting to a user a safe mobility area is shown. As seen in this FIG. 3, the method of this embodiment comprises: at 301—obtaining, by a processor: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; at 303—determining by the processor the safe mobility area, the determined safe mobility area being an area on the map that the user should not leave in order to permit the user to reach the final destination by the acceptable arrival time; at 305—determining by the processor which of the plurality of points of interest on the map can be visited by the user, and for how long, in order to permit the user to reach the final destination by the acceptable arrival time; at 307—providing by the processor, on a display, the determined safe mobility area; and at 309—providing by the processor, on the display, which of the plurality of points of interest on the map can be visited by the user, and for how long.

Figure 4:
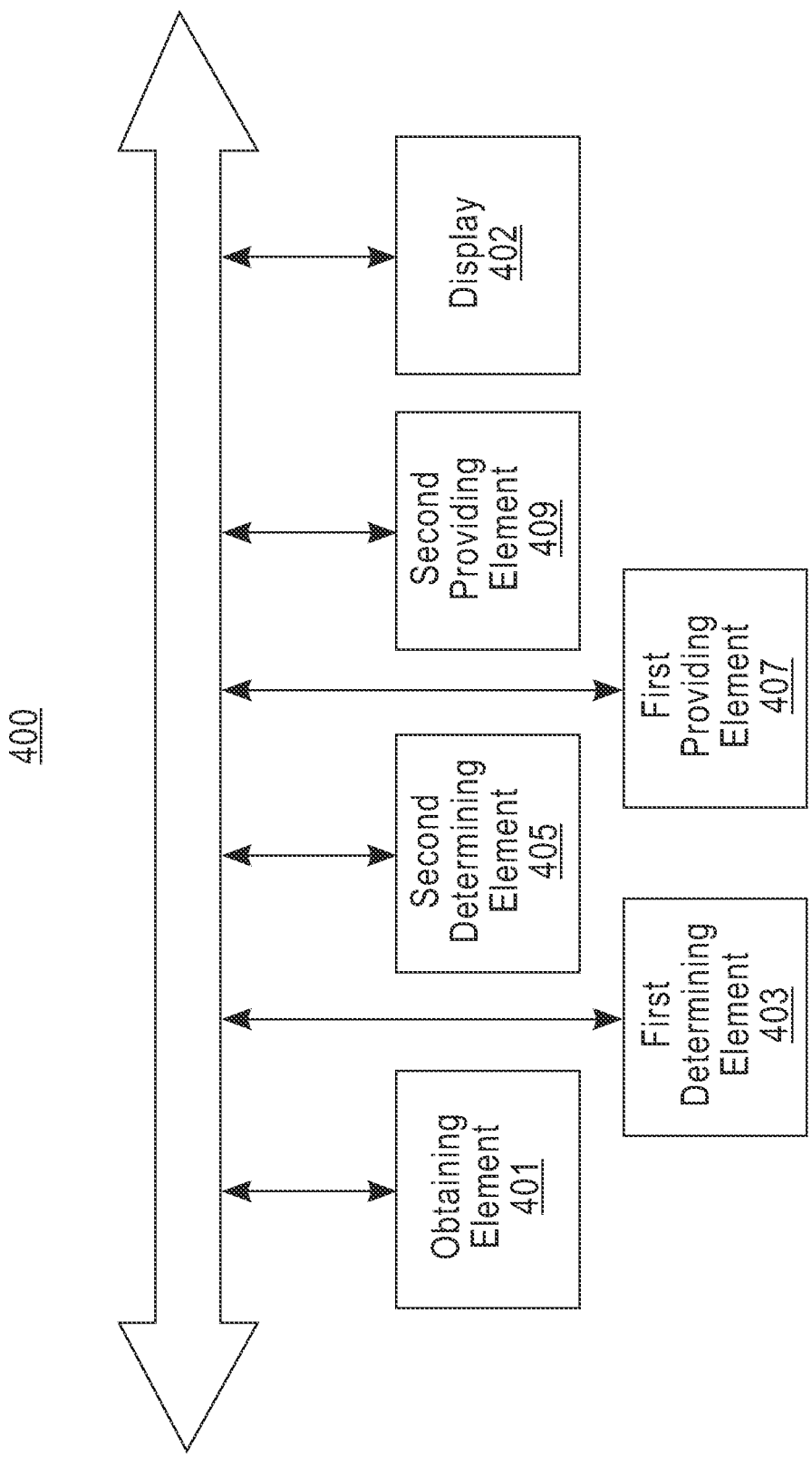
FIG. 4 depicts a block diagram of a system according to an embodiment.

Referring now to FIG. 4, in another embodiment a system 400 (including display 402) for presenting to a user a safe mobility area is provided. This system may include a processor (not shown); and a memory (not shown) storing computer readable instructions that, when executed by the processor, implement: an obtaining element 401 configured to obtain: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; a first determining element 403 configured to determine the safe mobility area, the determined safe mobility area being an area on the map that the user should not leave in order to permit the user to reach the final destination by the acceptable arrival time; a second determining element 405 configured to determine which of the plurality of points of interest on the map can be visited by the user, and for how long, in order to permit the user to reach the final destination by the acceptable arrival time; a first providing element 407 configured to provide, on the display, the determined safe mobility area; and a second providing element 409 configured to provide, on the display, which of the plurality of points of interest on the map can be visited by the user, and for how long. Further, in various examples the system may be in the form of one of: (a) a smart phone; (b) a tablet computer; (c) a netbook computer; and (d) a laptop computer.

In one example, communication between and among the various components of FIG. 4 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 5.

Figure 5:
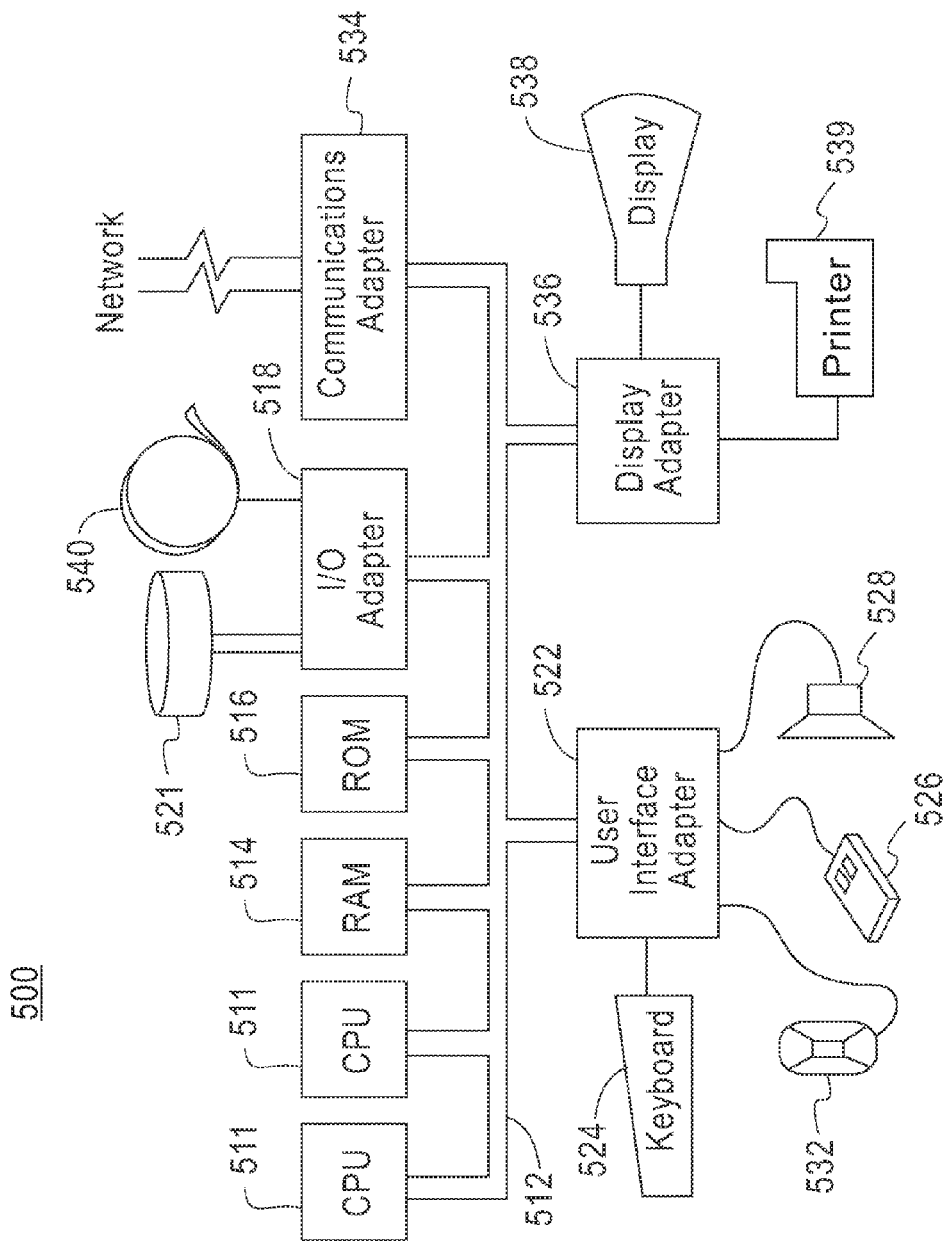
FIG. 5 depicts a block diagram of a system according to an embodiment.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

Reference will now be made to a use case involving a tourist in a city. In this example, the final goal of the tourist is to be at the airport at 5 pm. Further, the preferences of the tourist are as follows: (a) wants to visit several points of interest (as many as possible), each of which is chosen from a list of points of interest; (b) wants to do so without jeopardizing the final arrival time goal; and (c) wants to be free to decide what to visit (without letting the system decide for him/her).

In order to implement a mechanism to meet these goals, an embodiment of the invention provides for: (a) drawing a "safe" area (in terms of time) on an electronic map of a city, wherein the safe area indicates where the tourist can go without jeopardizing the on-time arrival at the airport (the mechanism may consider the transportation network and may keep track of possible journey plans from points of interest inside the safe area to the airport); (b) highlighting points of interest inside the safe area, that can be reached in the available time, and tag such points of interest with useful information (e.g., indicating the length of time that the tourist can visit a given point of interest before having to go to the airport); (c) update the safe area dynamically, including points of interest that can be visited (e.g., the safe area shrinks with the passing of time); (d) alerting the tourist if he/she moves out of the safe area; and/or (e) alerting the tourist when he/she must start the trip to the airport (and indicates the itinerary).

In another example, a journey planning application may be provided. In this example, a user may walk around freely (e.g., going through various shops) and the system may automatically compute and display a "safe" area (in terms of time) that allows the user to catch a bus to be home by a given time.

In another example, a taxi (or car service) application may be provided. In this example, a pre-booked order (for a future time) exists and the system may build a map of destinations that can be served before the pre-booked order (without jeopardizing picking up the pre-booked passenger in time).

In another example, an EV (electric vehicle) driving application may be provided. In this example, the final destination may be the user's home (where the EV can be recharged) and the system may compute and display an area of locations that can be visited without jeopardizing arriving at home before running out of battery power.

In another example, an application for a money-collecting crew may be provided. In this example, the final goal is to be at the bank at 5:00 p. The system may compute and display a map with money-collecting locations(s) that can be served before 5:00 pm, while ensuring on-time arrival at the bank.

In another example, an application for car-sharing may be provided. In this example, the car-sharing system may compute and display a map showing an area where picking-up new passenger(s) is possible, while ensuring that current passenger(s) arrive on-time to their destination(s).

In another example, an application for UAVs (unmanned aerial vehicles) and/or manned aircraft may be provided. In this example, the system may compute and display an area to explore that ensures returning safely to a base without running out of fuel.

As described herein, mechanisms are provided for computing and displaying a (maximized) safe mobility area (in terms of time). This safe mobility area may be an area inside which a user can act without jeopardizing a final goal specified by the user. In one specific example, the final goal is an arrival at a final destination by a certain time. In another specific example, the user may be alerted (e.g., via a visual alert, via an audio alert and/or via a tactile alert) when an action performed by the user takes the user out of the safe mobility area. In another specific example, the user may be alerted (e.g., via a visual alert, via an audio alert and/or via a tactile alert) when the user needs to act to remain inside a safe mobility area. In another specific example, the safe area may be dynamically evolving (that is, the safe mobility area may be computed dynamically, such that the safe mobility area shrinks as time passes (up to a point when the user must act to achieve the goal)). In another specific example, the final goal may change dynamically (thus causing the safe mobility area to also change dynamically).

Of note, the disclosed mechanisms do not impose specific actions on a human user. Rather, the disclosed mechanisms respect the user's freedom to decide, while computing and visualizing the limits of such freedom.

As described herein, the disclosed mechanisms provide one or more of the following advantages and values: (a) offering a "guarantee" that a final destination is reached in time; (b) maximizing the freedom of action to users, while satisfying their preferences and constraints; (c) applicable to the frequent scenarios where humans prefer to make the decisions (as opposed to executing a fully automated plan); (d) applicability to various journey planning and/or tourism applications; (e) may be offered as a service on the cloud and/or on client apps on smart phones/tablets.

As described herein, a mechanism is provided to compute a safe mobility area for a user. In one embodiment, the mechanism may take as input all or a subset of the following (one or more of which may change dynamically): (a) a map; (b) one or several target locations (POIs) on the map; (c) one final destination; (d) one acceptable arrival time at the final destination; (e) transportation network information; (f) POI opening hours; (g) a current time; (h) a current user location and/or (i) one or more user preferences (e.g., with respect to travel, transport (e.g., do not want to take a taxi because it is too expensive), points of interest). In one specific example, the acceptable arrival time at the final destination may be updated dynamically, which may trigger updates with respect to the computed safe mobility area (e.g., the user may receive an SMS indicating that the user's flight is delayed by 2 hours; based upon the SMS, the safe mobility area may be increased in size (the updated safe mobility area may include additional point(s) of interest and/or the maximum visitation interval for each existing point of interest may be increased)). Further, in this embodiment, the mechanism may provide as output the following: (a) a safe mobility area that the user should not leave, so that the user can reach the final destination on time; and (b) what target locations can be visited, and for how long (e.g., maximum visitation time intervals), without jeopardizing the arrival time at the final destination. In one example, the mechanism may further comprise computing the safe mobility area dynamically, as a function of one or several variables, one possible variable being the time. In another example, the safe mobility area may be visualized on a map. In another example, the mechanism may recommend to the user not to do one or more actions (e.g., that would take the user outside the safe mobility area). In another example, the mechanism may recommend one or more actions to the user to take (e.g., when the user must start the trip to the final destination) to ensure on-time arrival at the final destination (i.e., ensure the safe mobility area on the map does not reduce to zero before the user arrives at the final destination). In another example, the mechanism may recommend an action plan (e.g., what points of interest to visit, in which order). This action plan may be calculated, for example, to maximize the time spent at each point of interest.

In another example, mechanisms may be provided to make the calculations described herein with respect to multi-modal routes (e.g., bus and ferry; or train and walking).

As described herein, the safe mobility area enables the development of new systems and services delivering the safe mobility area notion to end users.

In one embodiment, a computer-implemented method for presenting to a user a safe mobility area is provided, the method comprising: obtaining, by a processor: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; determining by the processor the safe mobility area, the determined safe mobility area being an area on the map that the user should not leave in order to permit the user to reach the final destination by the acceptable arrival time; determining by the processor which of the plurality of points of interest on the map can be visited by the user, and for how long, in order to permit the user to reach the final destination by the acceptable arrival time; providing by the processor, on a display, the determined safe mobility area; and providing by the processor, on the display, which of the plurality of points of interest on the map can be visited by the user, and for how long.

In one example, the method further comprises obtaining by the processor operating times of the plurality of points of interest.

In another example, the determining which of the plurality of points of interest on the map can be visited by the user, and for how long, takes into account the operating times of the plurality of points of interest.

In another example, the method further comprises obtaining by the processor at least one user preference regarding at least one of: (a) a preferred mode of travel; and (b) a mode of travel that is not acceptable.

In another example, the determining which of the plurality of points of interest on the map can be visited by the user, and for how long, takes into account at least one of: (a) the preferred mode of travel; and (b) the mode of travel that is not acceptable.

In another example, the information related to a transportation network comprises information relating to: (a) a current travel time between locations by road using a private automobile; (b) a current travel time between locations by road using a hired automobile; (c) a current travel time between locations by road using a bus; (d) a current travel time between locations by rail using a train; (e) a current travel time between locations by air using an aircraft; (f) a current travel time between locations by water using a watercraft; and (g) a current travel time between locations by walking.

In another example, at least one of the current travel times takes into account a current level of traffic congestion.

In another example, the determined safe mobility area is presented on the display in the map.

In another example, the determined plurality of points of interest on the map that can be visited by the user, and for how long, are presented in the form of indicia on the map.

In another example, the determined plurality of points of interest on the map that can be visited by the user, and for how long, are presented in the form of indicia in a list.

In another example, the determined safe mobility area is computed dynamically, as a function of one or more variables.

In another example, one of the variables is current time.

In another example, the method further comprises providing by the processor, to the user, at least one recommendation not to take a certain action that would place the user outside the safe mobility area.

In another example, the method further comprises providing by the processor, to the user, at least one recommendation to take a certain action that would ensure that the user arrives on-time at the final destination.

In another embodiment, a computer readable storage medium, tangibly embodying a program of instructions executable by the computer for presenting to a user a safe mobility area is provided, the program of instructions, when executing, performing the following steps: obtaining: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; determining the safe mobility area, the determined safe mobility area being an area on the map that the user should not leave in order to permit the user to reach the final destination by the acceptable arrival time; determining which of the plurality of points of interest on the map can be visited by the user, and for how long, in order to permit the user to reach the final destination by the acceptable arrival time; providing, on a display, the determined safe mobility area; and providing, on the display, which of the plurality of points of interest on the map can be visited by the user, and for how long.

In one example, the determined safe mobility area is presented on the display in the map.

In another example, the determined plurality of points of interest on the map that can be visited by the user, and for how long, are presented in the form of indicia on the map.

In another example, the determined safe mobility area is computed dynamically, as a function of current time.

In another embodiment, a computer-implemented system for presenting to a user a safe mobility area is provided, the system including a display, the system comprising: a processor; and a memory storing computer readable instructions that, when executed by the processor, implement: an obtaining element configured to obtain: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location; a first determining element configured to determine the safe mobility area, the determined safe mobility area being an area on the map that the user should not leave in order to permit the user to reach the final destination by the acceptable arrival time; a second determining element configured to determine which of the plurality of points of interest on the map can be visited by the user, and for how long, in order to permit the user to reach the final destination by the acceptable arrival time; a first providing element configured to provide, on the display, the determined safe mobility area; and a second providing element configured to provide, on the display, which of the plurality of points of interest on the map can be visited by the user, and for how long.

In one example, the system is in the form of one of: (a) a smart phone; (b) a tablet computer; (c) a netbook computer; and (d) a laptop computer.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    obtaining, by a processor: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location;
    determining, by the processor, a safe mobility area comprising a geographic area on the map that a user should not leave in order to permit the user to reach the final destination by the acceptable arrival time;
    determining, by the processor, which of the plurality of points of interest on the map can be visited by the user, and for how long, prior to the user reaching the final destination, in order to permit the user to reach the final destination by the acceptable arrival time;
    providing by the processor, on a display, the determined safe mobility area; and
    providing by the processor, on the display, which of the plurality of points of interest on the map can be visited by the user, and for how long.

2. The method of claim 1, further comprising obtaining by the processor operating times of the plurality of points of interest.

3. The method of claim 2, wherein the determining which of the plurality of points of interest on the map can be visited by the user, and for how long, takes into account the operating times of the plurality of points of interest.

4. The method of claim 1, further comprising obtaining by the processor at least one user preference regarding at least one of: (a) a preferred mode of travel; and (b) a mode of travel that is not acceptable.

5. The method of claim 4, wherein the determining which of the plurality of points of interest on the map can be visited by the user, and for how long, takes into account at least one of: (a) the preferred mode of travel; and (b) the mode of travel that is not acceptable.

6. The method of claim 1, wherein the information related to a transportation network comprises information relating to: (a) a current travel time between locations by road using a private automobile; (b) a current travel time between locations by road using a hired automobile; (c) a current travel time between locations by road using a bus; (d) a current travel time between locations by rail using a train; (e) a current travel time between locations by air using an aircraft; (f) a current travel time between locations by water using a watercraft; and (g) a current travel time between locations by walking.

7. The method of claim 6, wherein at least one of the current travel times takes into account a current level of traffic congestion.

8. The method of claim 1, wherein the determined safe mobility area is presented on the display in the map.

9. The method of claim 1, wherein the determined plurality of points of interest on the map that can be visited by the user, and for how long, are presented in the form of indicia on the map.

10. The method of claim 1, wherein the determined plurality of points of interest on the map that can be visited by the user, and for how long, are presented in the form of indicia in a list.

11. The method of claim 1, wherein the determined safe mobility area is computed dynamically, as a function of one or more variables.

12. The method of claim 11, wherein one of the variables is current time.

13. The method of claim 1, further comprising providing by the processor, to the user, at least one recommendation not to take a certain action that would place the user outside the safe mobility area.

14. The method of claim 1, further comprising providing by the processor, to the user, at least one recommendation to take a certain action that would ensure that the user arrives on-time at the final destination.

15. A computer readable storage medium, tangibly embodying a program of instructions executable by the computer, the program of instructions, when executed, performing the following steps:
    obtaining: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location;
    determining a safe mobility area comprising a geographic area on the map that a user should not leave in order to permit the user to reach the final destination by the acceptable arrival time;
    determining which of the plurality of points of interest on the map can be visited by the user, and for how long, prior to the user reaching the final destination, in order to permit the user to reach the final destination by the acceptable arrival time;
    providing, on a display, the determined safe mobility area; and
    providing, on the display, which of the plurality of points of interest on the map can be visited by the user, and for how long.

16. The computer readable storage medium of claim 15, wherein the determined safe mobility area is presented on the display in the map.

17. The computer readable storage medium of claim 15, wherein the determined plurality of points of interest on the map that can be visited by the user, and for how long, are presented in the form of indicia on the map.

18. The computer readable storage medium of claim 15, wherein the determined safe mobility area is computed dynamically, as a function of current time.

19. A computer-implemented system comprising:
a processor; and
a memory storing computer readable instructions that, when executed by the processor, implement:
an obtaining element configured to obtain: (a) an electronic map; (b) an identification of a plurality of points of interest on the map; (c) an identification of a final destination; (d) an identification of an acceptable arrival time at the final destination; (e) information related to a transportation network; (f) a current time; and (g) a current user location;
a first determining element configured to determine a safe mobility area comprising a geographic area on the map that a user should not leave in order to permit the user to reach the final destination by the acceptable arrival time;
a second determining element configured to determine which of the plurality of points of interest on the map can be visited by the user, and for how long, prior to the user reaching the final destination, in order to permit the user to reach the final destination by the acceptable arrival time;
a display;
a first providing element configured to provide, on the display, the determined safe mobility area; and
a second providing element configured to provide, on the display, which of the plurality of points of interest on the map can be visited by the user, and for how long.

20. The system of claim 19, wherein the system is in the form of one of: (a) a smart phone; (b) a tablet computer; (c) a notebook computer; and (d) a laptop computer.

* * * * *